United States Patent [19]

Abe et al.

[11] Patent Number: 5,593,003
[45] Date of Patent: Jan. 14, 1997

[54] LUBRICATING MECHANISM FOR A LINEAR GUIDE APPARATUS

[75] Inventors: Yasushi Abe; Teishiro Tamura, both of Gunma, Japan

[73] Assignee: NSK Ltd., Tokyo, Japan

[21] Appl. No.: 590,447

[22] Filed: Jan. 23, 1996

[30] Foreign Application Priority Data

Jan. 24, 1995 [JP] Japan .................................. 7-008749

[51] Int. Cl.⁶ ...................................................... F16C 1/24
[52] U.S. Cl. ........................ 184/5.1; 184/109; 184/100; 384/13; 384/45
[58] Field of Search ........................... 184/5, 5.1, 21, 184/100; 384/13, 45

[56] References Cited

U.S. PATENT DOCUMENTS

| | | | |
|---|---|---|---|
| 4,927,272 | 5/1990 | Ward, Jr. | 184/105.3 |
| 5,362,157 | 11/1994 | Ichida | 384/45 |
| 5,374,126 | 12/1994 | Akasako et al. | 384/45 |
| 5,387,038 | 2/1995 | Abe et al. | 384/15 |
| 5,429,439 | 7/1995 | Hsu et al. | 384/13 |
| 5,501,527 | 3/1996 | Chang | 384/45 |

FOREIGN PATENT DOCUMENTS

| | | | |
|---|---|---|---|
| 0443098 | 8/1991 | European Pat. Off. | 384/45 |
| 74928 | 1/1995 | Japan | F16C 29/08 |

*Primary Examiner*—Thomas E. Denion
*Attorney, Agent, or Firm*—Sughrue, Mion, Zinn, Macpeak & Seas

[57] ABSTRACT

In a linear guide apparatus having an axially extending guide rail including a first loaded ball rolling groove formed in an inner lateral side of the guide rail; a slider fitted loosely inside the guide rail and including a second loaded ball rolling groove formed in an outer lateral side of the slider and a circulator with an unloaded ball circulating passage which extends axially; and a plurality of balls rolling along the first and second loaded ball rolling grooves via the unloaded ball circulating passage to support the slider moving axially relative to the guide rail, the linear guide apparatus further has a lubricating mechanism which includes a lubricant feed hole formed in a bottom of the guide rail and a lubricant injection port of the circulator to communicate with the unloaded ball circulating passage, the lubricant injection port connecting the lubricant feed hole at a predetermined position of the slider relative to the guide rail. The linear guide apparatus can freely be supplied with a lubricant from the outside.

6 Claims, 6 Drawing Sheets

LUBRICATING MECHANISM FOR A LINEAR GUIDE APPARATUS

BACKGROUND OF THE INVENTION

The present invention relates to a lubricating mechanism for a linear guide apparatus. More specifically, the present invention relates to a mechanism capable of externally supplying a lubricant freely to a linear guide apparatus in which a slider is supported inside a guide rail and moved axially relative to the guide rail with the intermediary of balls that rollingly circulate along rolling grooves via ball circulation passages within the slider.

Figure 9:
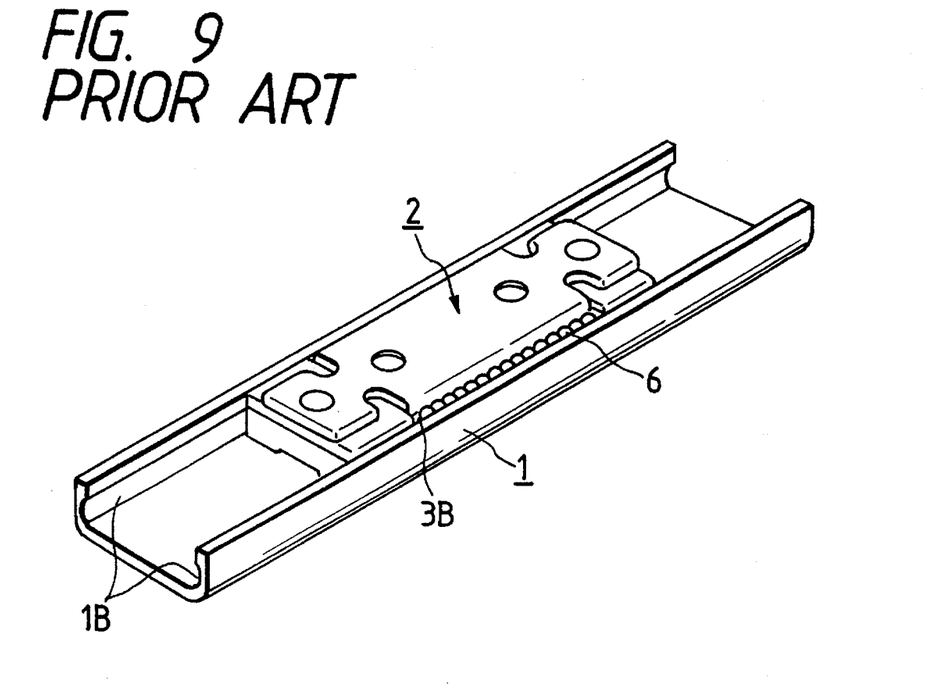
FIG. 9 is a general perspective view of a conventional miniature linear guide apparatus.

Among the linear guide apparatus of the type to which the present invention is applicable is a miniature linear guide apparatus as illustrated in FIG. 9. The apparatus provides an axially extending guide rail having a U-shaped cross section and a slider 2 which is slidably mounted within the guide rail. Each lateral side of the guide rail 1 has an axially extending loaded ball rolling groove 1B formed in the inner surface that is confronted with another axially extending loaded ball rolling groove 3B which is formed on each lateral side of the body 3 of the slider 2 in the outer surface. The slider 2 also has a ball circulating passage (not shown) on both sides of its interior which extends axially to communicate with the loaded ball rolling groove 3B by curving each end of the slider 2. A plurality of steel balls 6 are installed rollingly within the loaded ball rolling grooves 1B and 3B and the ball circulating passages. When the slider 2 makes a linear movement relative to the guide rail 1 by supporting of the guide rail, the balls roll within the slider to repeat an endless circulation.

Figure 10:
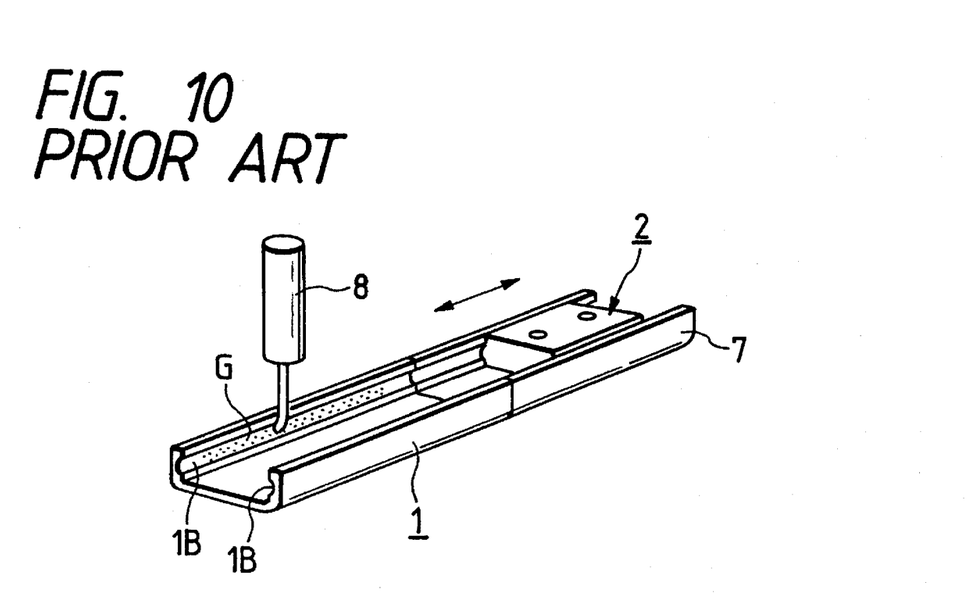
FIG. 10 is a perspective view illustrating a method of lubricating the conventional miniature linear guide apparatus.

The conventional miniature linear guide apparatus is not equipped with a mechanism that enables the external supply of a lubricant into the apparatus after it has been assembled. In order to lubricate the balls 6 while they roll to repeat the endless circulation, one of the following two methods is currently employed:

(1) as shown in FIG. 10, an auxiliary rail 7 is connected to an end of the guide rail 1 and the slider 2 is escaped to the auxiliary rail 7; then, a grease dispenser 8 is used to apply grease G to the loaded ball rolling groove 1B in the inner surface of each lateral side of the guide rail 1; thereafter, the slider 2 is returned to the guide rail 1 and reciprocated along the guide rail, thereby circulating the balls 6 coated with the grease film; and (2) alternatively, grease is dissolved in a suitable solvent and the linear guide apparatus is immersed in the solution, thereby coating the surfaces of balls 6 with a grease film.

However, these methods have their own disadvantages. In the first method, the reciprocal movement of the slider 2 must be repeated in order to insure that the grease is supplied evenly and adequately to all of the balls 6 within the loaded rolling grooves 1B and 3B, as well as in the ball circulating passages but this operation is not only time-consuming but also inefficient due to the tendency of the grease to splash about.

The second method has the advantage that grease can be readily supplied not only to the balls within the loaded rolling grooves but also to the balls within the ball circulating passages without moving the slider 2. On the other hand, only a small quantity of grease can be supplied in one operation and, hence, it is difficult to insure that the apparatus, once replenished with grease, is kept operated with satisfactory lubrication being maintained for an extended period. Another problem with maintenance is the difficulty of operating a fixedly quantitative application of grease.

Accordingly, even if any conventional methods are adopted, it is practically impossible to take a maintenance action after the lubrication of the linear guide apparatus is deteriorated and the grease refilling operation is even more difficult to perform on a linear guide apparatus equipped with seals.

SUMMARY OF THE INVENTION

The present invention has been accomplished under conventional circumstances and has as an object providing a lubricating mechanism for a linear guide apparatus that enables free supply of a lubricant from the outside of the apparatus, that is easy to maintain and that also secures prolonged service life.

The object can be attained by a linear guide apparatus providing: an axially extending guide rail including a U-shaped cross section, a first loaded ball rolling groove formed in an inner lateral side of the guide rail, and a lubricant feed hole in a bottom of the guide rail; a slider fitted loosely inside the guide rail and including a second loaded ball rolling groove formed in an outer lateral side of the slider, the second loaded ball rolling groove being confronted with the first loaded ball rolling groove, and including a circulator with an unloaded ball circulating passage which extends axially, the circulator including a lubricant injection port communicating with the unloaded ball circulating passage, the lubricant injection port connecting the lubricant feed hole at a predetermined position of the slider relative to the guide rail; and a plurality of balls rolling along the first and second loaded ball rolling grooves via the unloaded ball circulating passage to support the slider moving axially relative to the guide rail.

To operate the lubricating mechanism of the present invention, a lubricant injection device such as a grease dispenser is connected to the lubricant injection port in the bottom of the guide rail and the lubricant is injected into the linear guide apparatus from the outside. The injected lubricant flows through the lubricant feed passages within the slider to be distributed equally between the unloaded ball circulating passages on the right and left sides of the slider. Thus, the lubricant adheres to the balls which are rolling and moving along the unloaded a ball circulating passages and it is carried to the loaded ball rolling grooves in the mating surfaces of the slider and the guide rail.

DETAILED DESCRIPTION OF THE INVENTION

Four embodiments of the present invention will now be described with reference to accompanying drawings. All parts that are the same as or equivalent to those used in the conventional linear guide apparatus are identified by like numerals.

Figure 1:
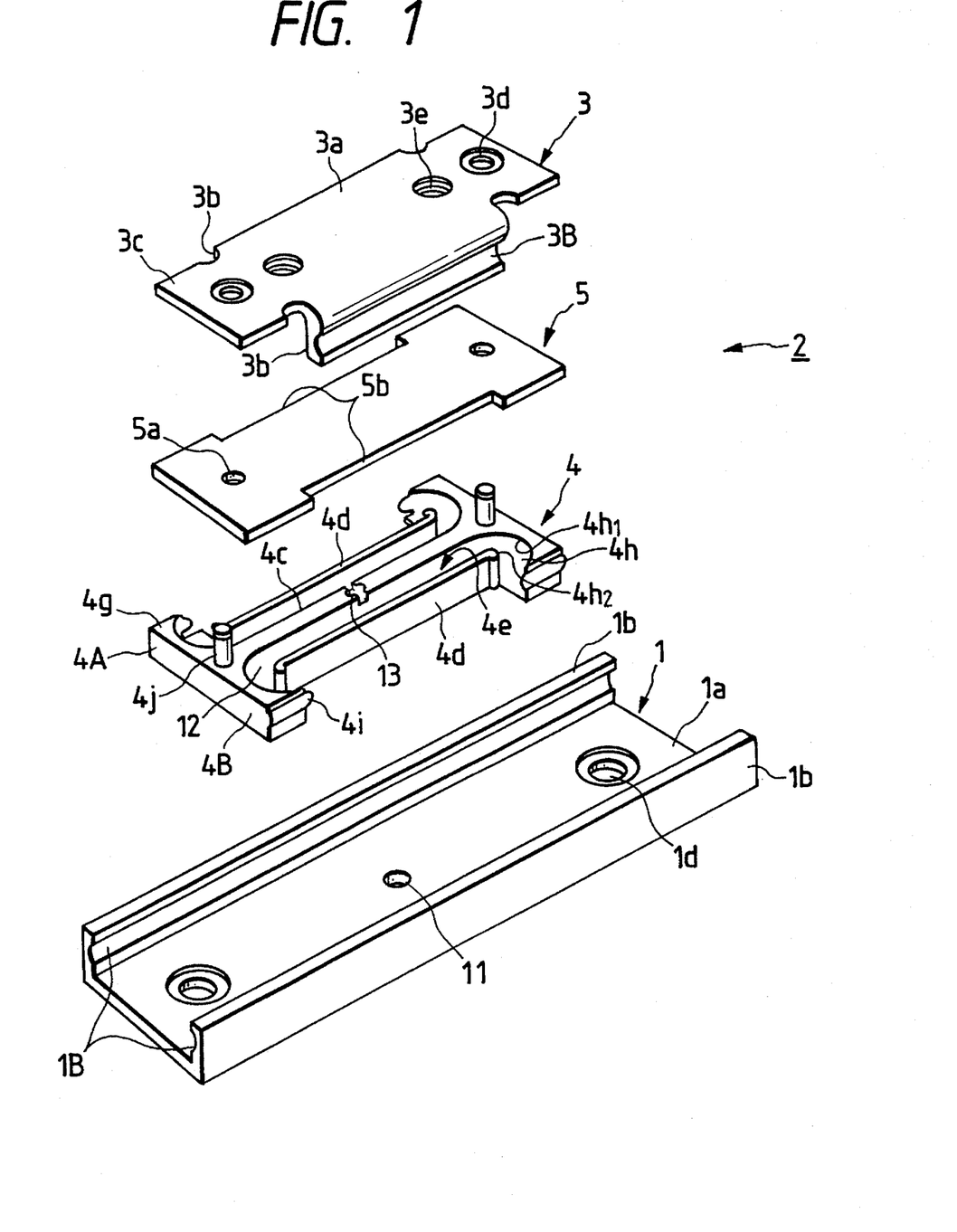
FIG. 1 is an exploded perspective view of a linear guide apparatus according to a first embodiment of the present invention.
Figure 2:
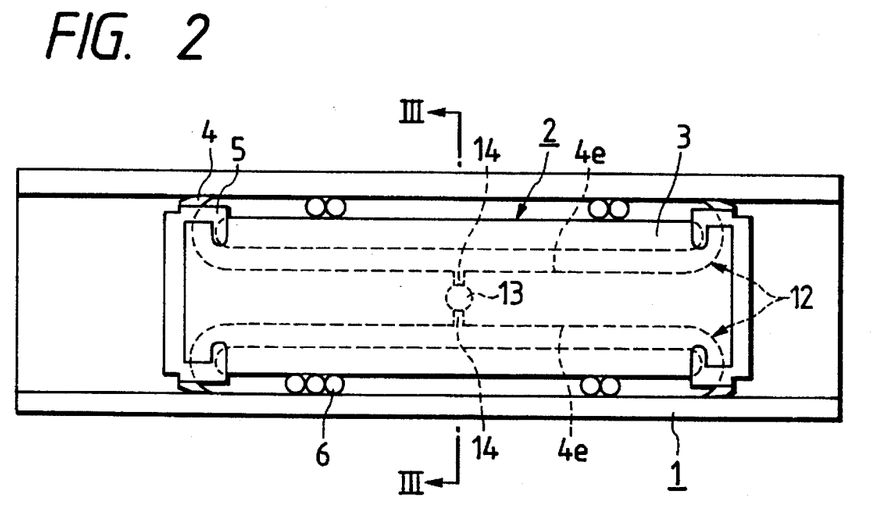
FIG. 2 is a general plan view of the same linear guide apparatus with the necessary parts put together in an operative state.
Figure 3:
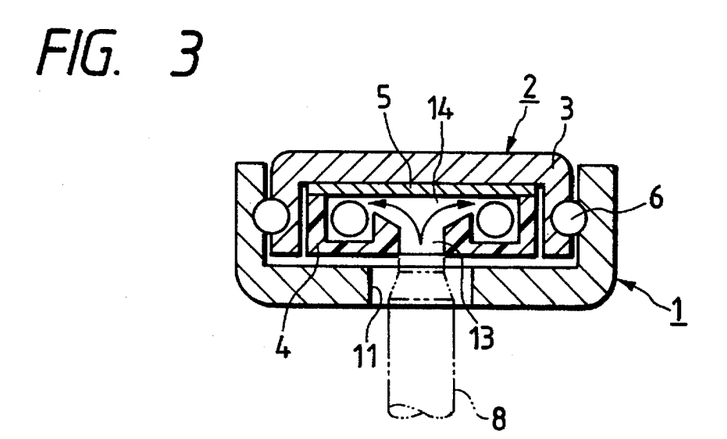
FIG. 3 is a section of FIG. 2 taken on line III—III.

In a first embodiment of the present invention shown in FIGS. 1–3, a guide rail 1 for guiding a slider 2 is formed by pressing a steel plate into a generally U-shaped cross section including a bottom plate 1a and two sidewalls 1b which are formed by bending both lateral edges of the bottom plate 1a upward to provide guide plates. Each sidewall 1b has an axially extending loaded ball rolling groove 1B formed in the inner surface. The two loaded ball rolling grooves 1B are parallel to each other and Gothic arched (or generally semicircular) in cross section. The bottom plate 1a has a spot facing hole 1d formed near either end such that a screw or bolt can be passed through it for mounting the guide rail 1 on another part before putting the miniature linear guide apparatus to service. The bottom plate 1a also has a lubricant feed hole 11 formed substantially in the center such that the end of a grease dispenser can be inserted into the hole.

The slider 2 includes a body 3 made of a thin steel plate, a circulator 4 made of a synthetic resin and a cap 5 which is also made of a thin steel plate.

The slider body 3 has a width whose outer dimension is somewhat smaller than the distance between the inner surfaces of the sidewalls 1b of the guide rail 1; it is formed in a generally U-shaped cross section including a top plate 3a and two sidewalls 3b which are formed by bending both lateral edges of the top plate 3a downward. The thus shaped slider body 3 is placed between the two sidewalls 1b of the guide rail 1. The sidewalls 3b have axially extending loaded ball rolling grooves 3B formed in the outer surfaces which are confronted with the loaded ball rolling grooves 1B in the guide rail 1. The loaded ball rolling grooves 3B are similar to the rolling grooves 1B in the guide rail 1 in that they have a Gothic arched (or generally semicircular) cross section. The top plate 3a has an extension 3c at either end in such a way that it projects beyond the sidewalls 3b in a longitudinal direction. Each extension 3c has a spot facing hole 3d for engagement with the circulator 4. Formed inward of the holes 3d are holes 3e through which screws or bolts are to be inserted for mounting the slider 2 on another part Such as a table.

The circulator 4 is formed by injection molding. Its body has an E-shaped cross section including a center partition 4c, two walls 4d erected on the right and left sides of the partition 4c, and two unloaded ball circulating grooves 4e each extending axially between the center partition 4c and the right (or left) wall 4d. The body is to be fitted between the sidewalls 3b of the slider body 3. The circulator body has a flange 4g extending from both axial ends. Each flange 4g has semicircularly arched grooves 4h that communicate with the unloaded ball circulating grooves 4e. Each unloaded ball circulating groove 4e combines with the semicircularly curved grooves 4h at both ends to make an unloaded ball circulating passage 12. The arcuate surface $4h_1$ of each groove 4h has the same curvature as an inner arcuate surface $4h_2$ which is formed at either axial end of each wall 4d; thus, rolling balls can be guided smoothly between the outer and inner arcuate surfaces. Each flange 4g has a ball scooping projection 4i formed at either lateral end which corresponds to an open end of each curved groove 4h (that communicates with the loaded ball rolling groove 1B in the guide rail 1); the ball scooping projections 4i are engageable with the loaded ball rolling grooves 1B in such a way that the rolling balls can be circulated smoothly during operation of the linear guide apparatus. The circulator 4 has a cylindrical engaging projection 4j which is projected on the top surface of each flange 4g.

The thus constructed circulator 4 has lubricant injection port 13 provided through the center of the partition 4c as shown in FIG. 1. The entrance side of the port 13 is confronted with the lubricant feed hole 11 in the guide rail 1. On the other hand, the exit side of the port 13 communicates with the unloaded ball circulating grooves 4e and, hence, the unloaded ball circulating passages 12, via a lubricant feed passage 14 traversing the partition 4c (see FIG. 2).

The cap 5 of the slider 2 has through-holes 5a near both axial ends in such a way that the cylindrical engaging projections 4j on the flanges 4g of the circulator 4 can be passed through the holes 5a. The cap 5 also has cutouts 5b on the two lateral edges in such a way that the two sidewalls 3b of the slider body 3 can be fitted into engagement with the cutouts 5b. The cap 5 is an optional member and may be used when the slider 2 is to be secured to a mating part by screws and its primary purpose is to ensure that no chip adhering to the inner surfaces of the mounting holes 3e enters the unloaded ball circulating passages 12.

The slider 2 is assembled by the following procedure. First, the cylindrical engaging projections 4j on the circulator 4 are inserted through the holes 5a in the cap 5, thereby fitting the cap 5 over the circulator 4. Then, the slider body 3 is placed over the two members. The engaging projections 4j on the circulator 4 are inserted through the spot facing holes 3d in the extensions 3c.

In the next step, the head of each projection 4j beyond the top of the slider body 3 is thermally compressed so as to fuse them together, so that the slider body 3 and the circulator 4 are secured integrally, with the cap 5 interposed, to assemble the slider 2. As a result, the unloaded ball circulating grooves 4e and the curved grooves 4h in the circulator 4 are covered with the cap 5 and, at the same time, the inner arcuate surfaces $4h_2$ at the four open ends on the curved grooves 4h are connected smoothly to the loaded ball rolling grooves 3B in the slider body 3, thereby forming smooth unloaded ball circulating passages 12 having no steps at the joints.

The thus assembled slider is loosely fitted in the guide rail 1 and a plurality of balls are set not only within the unloaded ball circulating passages 12 but also between the loaded ball rolling grooves 1B in the guide rail 1 and the mating loaded ball rolling grooves 3B in the slider 2.

The outer arcuate surfaces $4h_1$ at the open ends of curved grooves 4h are connected in proximity with the bottoms of loaded ball rolling grooves 1B in the guide rail 1 via ball scooping projections 4i at lateral ends of flanges 4g of the circulator 4 and this ensures smooth circulation of the balls.

The operation of the lubricating mechanism according to the first embodiment of the present invention will now be described. First, the slider 2 and the balls 6 are assembled in the guide rail 1 and lubricant grease is supplied in the following manner. The slider 2 is moved manually along the guide rail 11 such that the lubricant injection port 13 in the slider is confronted (connected) with the lubricant feed hole 11 in the bottom of the guide rail. Then, the end of grease dispenser 8 filled with grease is inserted into the lubricant feed hole 11 so that it is connected to the lubricant injection port 13 (see FIG. 3). The grease is injected into the slider through the port 13 and the hole 14 to be distributed equally between the unloaded ball circulating grooves 4e (hence, the unloaded ball circulating passages 12) on opposite sides of the slider. Thus the lubricant can be supplied into the slider from the outside of the linear guide apparatus at any time that is necessary and in an easy manner.

The guide rail 1 is usually secured to a machine by bolts whereas the slider 2 is mounted on a table. When the table is driven, the slider 2 is moved axially along the guide rail 1. The balls 6 installed between a loaded ball rolling groove 1B in the guide rail 1 and the mating loaded ball rolling groove 3B in the slider body 3 roll as the movement of the slider 2 and move along those grooves in the same direction but at a slower speed. When the rolling balls reach the flange 4g at an end of the circulator 4, they are scooped up by the ball scooping projection 4i to enter the curved groove 4h, where they make a U-turn to return to the loaded ball rolling groove 1B in the guide rail 1 and the mating loaded ball rolling groove 3B in the slider body 3. The rolling balls repeat the circulation endlessly.

During the circulation of the balls, the grease already injected into the unloaded ball circulating grooves 4e adheres to the surfaces of the balls 6. While the balls move along the unloaded ball circulating passages 12, the grease is carried to both loaded ball rolling grooves 1B and 3B. In this way, the grease is distributed to every part of the ball circulating passages thereby assuring smooth lubrication of the linear guide apparatus.

Figure 4:
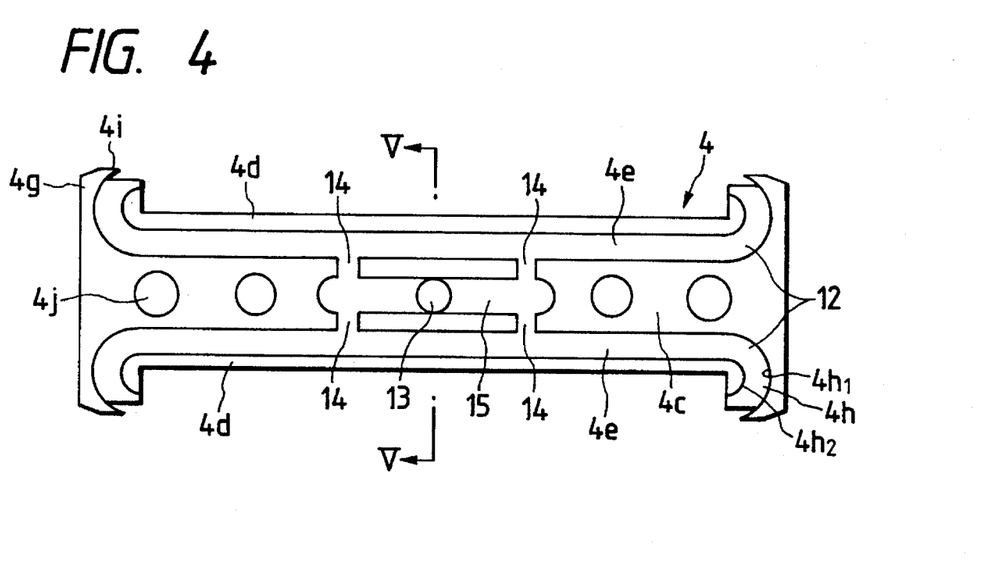
FIG. 4 is a plan view of a circulator as part of a lubricating mechanism for a linear guide apparatus according to a second embodiment of the present invention.
Figure 5:
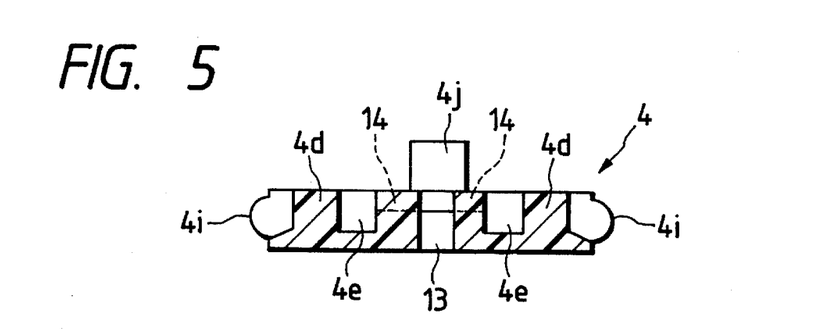
FIG. 5 is a section of FIG. 4 taken on line V—V.

A second embodiment of the present invention is shown in FIGS. 4 and 5. In this embodiment, an axially extending grease reservoir 15 is provided as a groove at the exit end of the lubricant injection port 13 in the circulator 4 such that grease is supplied from both ends of the reservoir 15 to pass through the lubricant feed passage 14 and distributed equally between the unloaded ball circulating passages 4e on opposite sides of the circulator 4.

The grease injected through the port 13 is not only distributed to every part of the ball circulating passages but also retained in a large quantity within the grease reservoir 15. Therefore, even if the grease in the loaded ball rolling grooves 1B and 3B is depleted with time, an additional amount of grease is gradually supplied from the reservoir 15 into those grooves via the feed passage 14 as the rolling balls 6 continue their rolling movement. Thus, the linear guide apparatus is kept lubricated in a satisfactory manner over an extended period of time.

Figure 6:
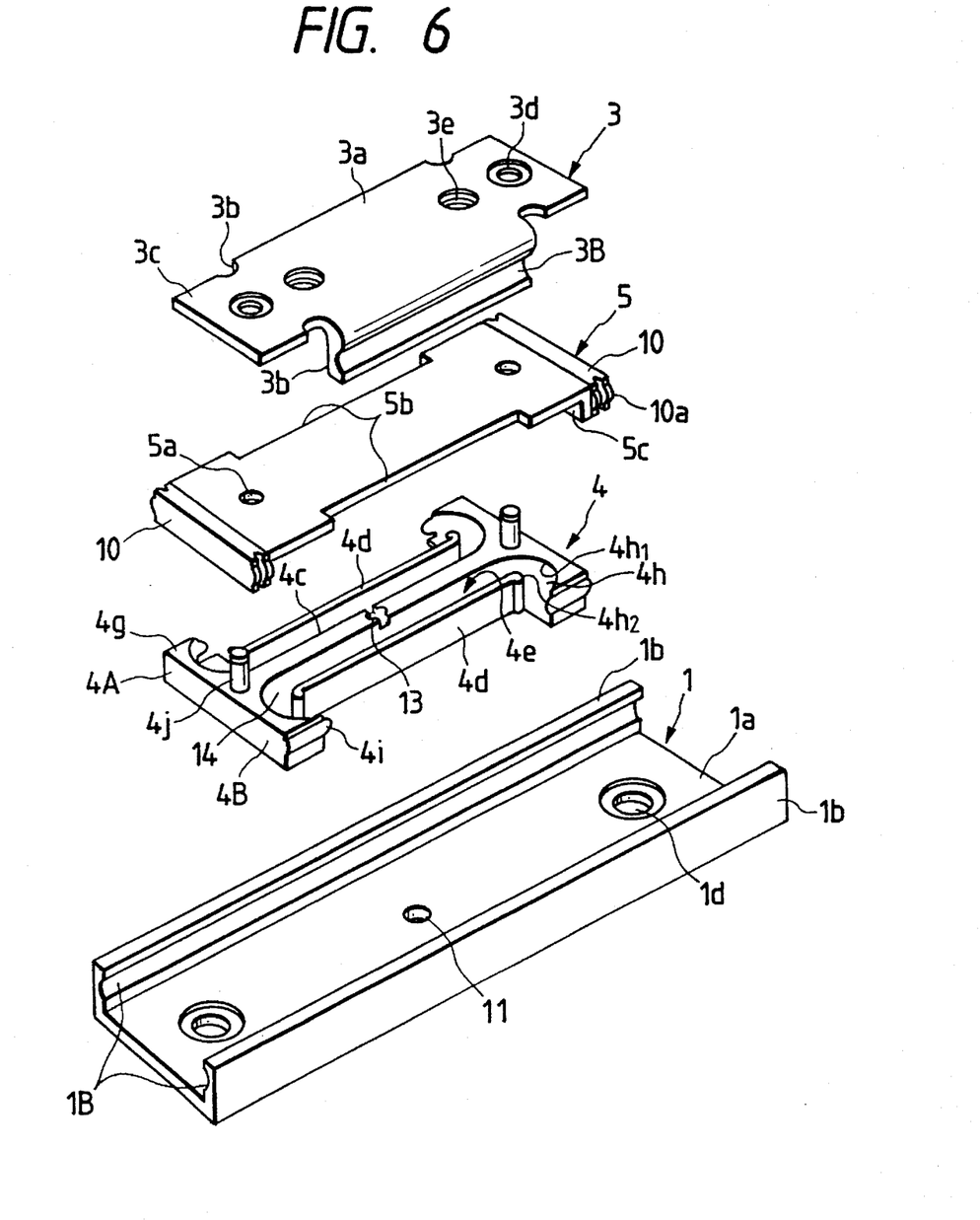
FIG. 6 is an exploded perspective view of a linear guide apparatus according to a third embodiment of the present invention.
Figure 7:
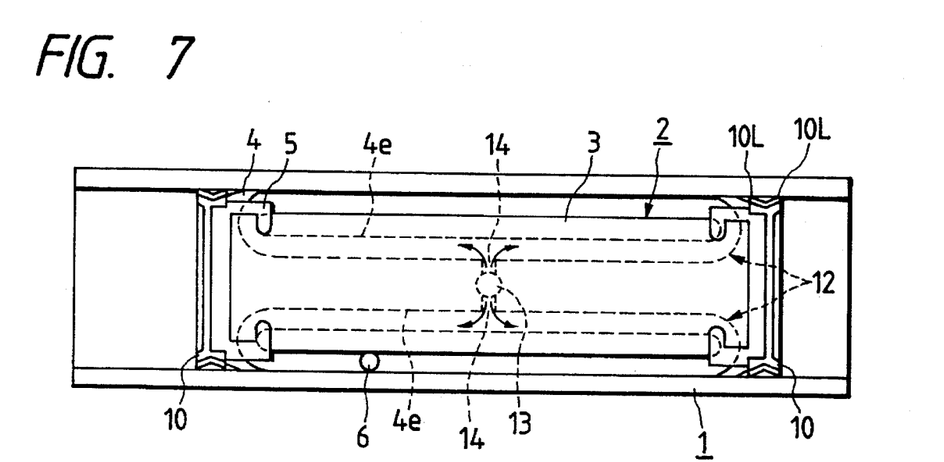
FIG. 7 is a general plan view of the same linear guide apparatus with the necessary parts put together in an operative state.

A lubricating mechanism according to a third embodiment of the present invention is shown in FIGS. 6 and 7. In this embodiment, a light-weight linear guide apparatus having a seal member 10 at both ends of the slider 2 is equipped with a lubricating mechanism of the same type as used in the first embodiment. It the illustrated case, the seal members 10 are of a double-lip type having two seal lips 10L (see FIG. 7) but this is not the sole case of the present invention and seal members of a single-lip type may be used.

The seal member 10 is fitted to both ends of the cap 5. Stated more specifically, both axial ends of the cap 5 are bent down to form right-angled projections 5c and the seal member (side seal) 10 shaped from synthetic rubbers is secured to the outer surface of each projection 5c by a suitable manner such as welding, bonding or tight fitting. Each seal member 10 has semicircular projections 10a formed on opposite lateral faces such that they project into the loaded ball rolling grooves 1B in the guide rail 1 to make slidable contact with the inner surfaces of these grooves, thereby closing the slight clearances that form between the outer surfaces of the guide rail 1 and the inner surfaces of the slider 2 after the it is mounted in the guide rail.

When the slider 2 moves, both sides of each seal member 10 make slidable contact not only with the inner surfaces of the sidewalls 1b of the guide rail 1 which serve as guide planes but also with the inner surfaces of the loaded ball rolling grooves 1B; in addition, the underside of each seal member 10 makes slidable contact with the bottom plate 1a of the guide rail 1; thus, the seal members 10 can close all clearances that form between the guide rail 1 and the slider 2. Each of the seal lips 10L forms the sides and the projection 10a. Of the two seal lips 10L, the outer seal lip ensures that foreign matter such as dirt adhering to the inner surfaces of the guide rail 1 does not enter the slider 2. On the other hand, the inner seal lip ensures that grease does not leak out of the slider 2. Because of this double-seal action, the biting of foreign matter and the wastage of grease are eliminated, thereby enabling the linear guide apparatus to be operated for a longer period than in the first embodiment.

Figure 8:
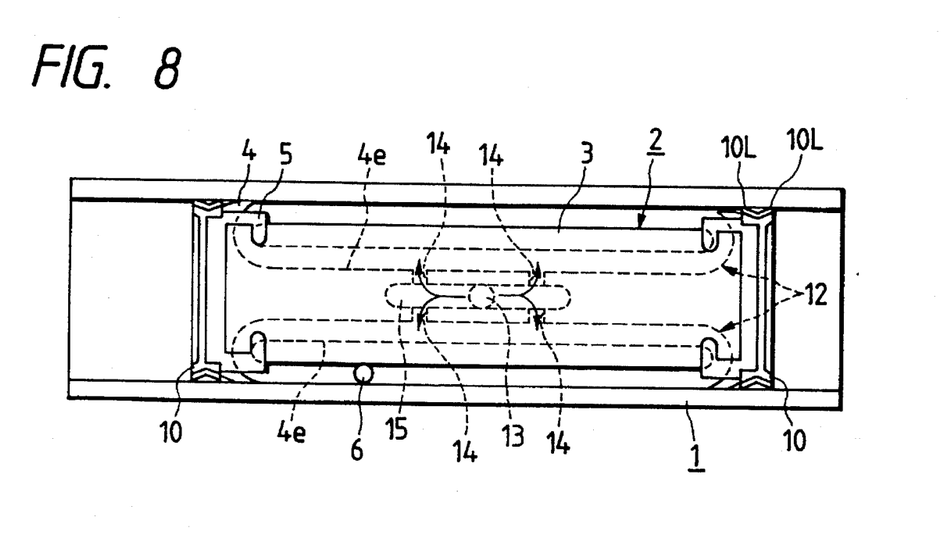
FIG. 8 is a general plan view of a linear guide apparatus according to a fourth embodiment of the present invention.

FIG. 8 shows a fourth embodiment of the present invention. In this embodiment, a light-weight linear guide apparatus having a seal member 10 at both ends of the slider 2 is equipped with a lubricating mechanism of the same type as used in the second embodiment which has grease reservoir 15. The operational and advantageous features of the seal lips 10L combine with those of the grease reservoir 15 to enhance the 10 ability of the slider 2 to retain grease in its interior, so that the linear guide apparatus can be lubricated more effectively than in the second embodiment.

The lubricating mechanism of the present invention is applicable not only to the light-weight miniature linear guide apparatus discussed above with reference to the four embodiments but also to any other types of linear guide apparatus that have the slider mounted inside the guide rail.

As described above, the lubricating mechanism of the present invention for a linear guide apparatus is such that the apparatus provides an axially extending guide rail that has a U-shaped cross section and which has a pair of axial loaded ball rolling grooves formed in the inner surfaces of opposed lateral sides, a slider fitted loosely inside the guide rail and which has a second pair of loaded ball rolling grooves formed in the outer surfaces of both lateral sides which are confronted with the loaded ball rolling grooves in the guide rail and that has a circulator in the interior which has axially extending unloaded ball circulating passages, and a plurality of balls that move along the two pairs of loaded ball rolling grooves via the unloaded ball circulating passages such that the slider is supported on and moves axially relative to the guide rail with the intermediary of the rolling of the balls, and it is characterized in that the circulator is provided with a lubricant injection port which communicates with the unloaded ball circulating passages and that a lubricant feed hole is provided in the bottom plate of the guide rail in such a way that the feed hole communicates with the lubricant injection port when the slider is located at a specified position on the guide rail. Having this lubricating mechanism, the linear guide apparatus can be freely supplied with a lubricant into the ball circulating passages within the slider from the outside of the apparatus; as a result, the maintenance of the apparatus is simplified and its service life is extended.

Additional advantages can be obtained if a grease reservoir or seal members are provided in the lubricating mechanism.

What is claimed is:

1. A linear guide apparatus comprising:

an axially extending guide rail including a U-shaped cross section, a first loaded ball rolling groove formed in an inner lateral side of the guide rail, and a lubricant feed hole in a bottom of the guide rail;

a slider fitted loosely inside the guide rail and including a second loaded ball rolling groove formed in an outer lateral side of the slider, the second loaded ball rolling groove being confronted with the first loaded ball rolling groove, and including a circulator with an unloaded ball circulating passage which extends axially, the circulator including a lubricant injection port communicating with the unloaded ball circulating passage, the lubricant injection port connecting the lubricant feed hole at a predetermined position of the slider relative to the guide rail; and a plurality of balls rolling along the first and second loaded ball rolling grooves via the unloaded ball circulating passage to support the slider moving axially relative to the guide rail.

2. The linear guide apparatus of claim 1, wherein the circulator includes an axially extending grease reservoir at an exit end of the lubricant injection port, the grease reservoir including lubricant feed passages in both ends which communicate with the unloaded ball circulating passage.

3. The linear guide apparatus of claim 1, wherein the slider includes a seal member at its end which has a projection on a lateral face of the seal member to contact slidably the first loaded ball rolling groove.

4. The linear guide apparatus of claim 3, wherein the projection comprises a pair of seal lips.

5. The linear guide apparatus of claim 2, wherein the slider includes a seal member at an end which has a projection on a lateral face of the seal member to contact slidably the first loaded ball rolling groove.

6. The linear guide apparatus of claim 5, wherein the projection comprises a pair of seal lips.

* * * * *